(12) United States Patent
Zhao et al.

(10) Patent No.: US 11,951,842 B2
(45) Date of Patent: Apr. 9, 2024

(54) ELECTRIFIED VEHICLE CONFIGURED TO SELECTIVELY DEACTIVATE RESTRICTED POWER MODE BASED ON ACCELERATION REQUEST

(71) Applicant: Ford Global Technologies, LLC, Dearborn, MI (US)

(72) Inventors: Yanan Zhao, Ann Arbor, MI (US); Xiaohong Nina Duan, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 459 days.

(21) Appl. No.: 17/485,912

(22) Filed: Sep. 27, 2021

(65) Prior Publication Data
US 2023/0094310 A1    Mar. 30, 2023

(51) Int. Cl.
*G06F 17/00* (2019.01)
*B60L 3/00* (2019.01)
(Continued)

(52) U.S. Cl.
CPC .......... *B60L 3/0046* (2013.01); *B60L 15/20* (2013.01); *B60L 50/60* (2019.02); *B60L 58/16* (2019.02);
(Continued)

(58) Field of Classification Search
CPC ........ B60L 3/0046; B60L 15/20; B60L 50/60; B60L 58/16; B60L 2240/14;
(Continued)

(56) References Cited

U.S. PATENT DOCUMENTS

| | | | | |
|---|---|---|---|---|
| 5,929,609 | A * | 7/1999 | Joy ...................... | H02J 7/1446 322/29 |
| 6,775,601 | B2 * | 8/2004 | MacBain .............. | B60W 10/08 180/65.25 |

(Continued)

FOREIGN PATENT DOCUMENTS

| | | | | |
|---|---|---|---|---|
| CA | 2911036 A1 | * | 11/2014 | .......... B60L 11/1864 |
| CN | 206124782 U | * | 4/2017 | |

(Continued)

OTHER PUBLICATIONS

Acceleration curve optimization for electric vehicle based on energy consumption and battery life (Year: 2019).*

*Primary Examiner* — Ronnie M Mancho
(74) *Attorney, Agent, or Firm* — David B. Kelley; Carlson, Gaskey & Olds, P.C.

(57) ABSTRACT

This disclosure relates to an electrified vehicle configured to selectively deactivate a restricted power mode based on an acceleration request, such as an imminent or current acceleration request. A corresponding method is also disclosed. An example electrified vehicle includes a battery and a controller configured to apply a restricted power mode when a state of health of the battery is below a predefined lower threshold. Further, when in the restricted power mode, the controller is configured to limit an amount of power drawn from the battery. Additionally, the controller is configured to selectively deactivate the restricted power mode in response to a signal indicating a current or imminent request for acceleration of the electrified vehicle requiring power to be drawn from the battery above an upper limit of the restricted power mode.

20 Claims, 3 Drawing Sheets

(51) Int. Cl.
   *B60L 15/20*   (2006.01)
   *B60L 50/60*   (2019.01)
   *B60L 58/16*   (2019.01)
   *B60K 6/28*    (2007.10)

(52) U.S. Cl.
   CPC ............ *B60K 6/28* (2013.01); *B60L 2240/14* (2013.01); *B60L 2240/54* (2013.01); *B60L 2240/645* (2013.01); *B60L 2250/28* (2013.01); *B60Y 2200/91* (2013.01); *B60Y 2200/92* (2013.01)

(58) Field of Classification Search
   CPC .......... B60L 2240/54; B60L 2240/645; B60L 2250/28; B60L 58/14; B60K 6/28; B60Y 2200/91; B60Y 2200/92; Y02T 10/70
   USPC .......................................................... 701/22
   See application file for complete search history.

(56) References Cited

U.S. PATENT DOCUMENTS

| | | | | |
|---|---|---|---|---|
| 7,079,942 | B2* | 7/2006 | McGee | B60W 10/08 180/65.265 |
| 8,140,204 | B2* | 3/2012 | Okubo | B60W 10/26 903/930 |
| 9,738,265 | B2* | 8/2017 | Johri | B60K 6/48 |
| 9,802,601 | B2* | 10/2017 | Wang | B60W 10/26 |
| 10,222,428 | B2* | 3/2019 | Saint-Marcoux | G01R 31/392 |
| 10,836,375 | B2* | 11/2020 | Kaufman | B60W 20/13 |
| 11,358,596 | B2* | 6/2022 | Meyer | B60W 30/18063 |
| 2004/0030469 | A1* | 2/2004 | MacBain | B60W 10/08 180/65.25 |
| 2009/0140698 | A1* | 6/2009 | Eberhard | B60L 58/16 320/152 |
| 2010/0106351 | A1* | 4/2010 | Hanssen | H02J 7/14 29/401.1 |
| 2014/0228168 | A1* | 8/2014 | Kaufman | B60W 20/13 180/65.265 |
| 2015/0203091 | A1* | 7/2015 | Wang | B60W 10/06 180/65.265 |
| 2020/0348744 | A1 | 11/2020 | Rabii et al. | |
| 2021/0188125 | A1* | 6/2021 | Zhao | H01M 10/486 |
| 2023/0094310 | A1* | 3/2023 | Zhao | B60L 50/60 701/22 |
| 2023/0182756 | A1* | 6/2023 | Ademane | B60W 50/087 701/36 |

FOREIGN PATENT DOCUMENTS

| | | | | |
|---|---|---|---|---|
| CN | 103978974 | B * | 2/2018 | ............... B60K 6/26 |
| CN | 109204063 | A * | 1/2019 | |
| CN | 111055845 | A * | 4/2020 | ............. B60L 15/20 |
| CN | 112829632 | A | 7/2020 | |
| CN | 110780203 | B * | 11/2020 | ......... G01M 17/007 |
| CN | 109204063 | B * | 8/2021 | |
| CN | 113625692 | A * | 11/2021 | |
| CN | 112172608 | B * | 5/2022 | ............ B60L 3/0046 |
| DE | 102022123541 | A1 * | 3/2023 | ............. B60L 15/20 |

* cited by examiner

ELECTRIFIED VEHICLE CONFIGURED TO SELECTIVELY DEACTIVATE RESTRICTED POWER MODE BASED ON ACCELERATION REQUEST

TECHNICAL FIELD

This disclosure relates to an electrified vehicle configured to selectively deactivate a restricted power mode based on an acceleration request, such as an imminent or current acceleration request. A corresponding method is also disclosed.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage traction battery pack typically powers the electric machines and other electrical loads of the electrified vehicle. The traction battery pack may include one or more groupings of interconnected battery cells. The battery cells generate heat during certain conditions, including during charging and discharging operations.

SUMMARY

An electrified vehicle according to an exemplary aspect of the present disclosure includes, among other things, a battery and a controller configured to apply a restricted power mode when a state of health of the battery is below a predefined lower threshold. Further, when in the restricted power mode, the controller is configured to limit an amount of power drawn from the battery. Additionally, the controller is configured to selectively deactivate the restricted power mode in response to a signal indicating a current or imminent request for acceleration of the electrified vehicle requiring power to be drawn from the battery above an upper limit of the restricted power mode.

In a further non-limiting embodiment of the foregoing electrified vehicle, the controller receives the signal when the vehicle is in a driving mode permitting acceleration requiring power to be drawn from the battery above the upper limit.

In a further non-limiting embodiment of any of the foregoing electrified vehicles, the controller receives the signal when the vehicle is in a sport driving mode.

In a further non-limiting embodiment of any of the foregoing electrified vehicles, the controller receives the signal when the vehicle is currently or imminently driving at a location known to correspond to a request for acceleration of the electrified vehicle requiring power to be drawn from the battery above the upper limit.

In a further non-limiting embodiment of any of the foregoing electrified vehicles, the location is a highway on-ramp.

In a further non-limiting embodiment of any of the foregoing electrified vehicles, the controller receives the signal when movement of the accelerator pedal of the vehicle exceeds a pedal travel threshold.

In a further non-limiting embodiment of any of the foregoing electrified vehicles, the controller receives the signal when a rate of movement of an accelerator pedal exceeds a pedal rate threshold.

In a further non-limiting embodiment of any of the foregoing electrified vehicles, the controller is configured to determine that the state of health of the battery is below the predefined lower threshold based on a current health of the battery at a mileage compared to an expected health of the battery at the mileage.

In a further non-limiting embodiment of any of the foregoing electrified vehicles, the controller is configured to determine that the state of health of the battery is below the predefined lower threshold based on a current health of the battery at a time compared to an expected health of the battery at the time.

In a further non-limiting embodiment of any of the foregoing electrified vehicles, the controller is configured to determine that the state of health of the battery is below the predefined lower threshold based on a current health of the battery at a mileage and a time compared to an expected health of the battery at the mileage and the time.

In a further non-limiting embodiment of any of the foregoing electrified vehicles, when in the restricted power mode, the controller is configured to determine an adjustment ratio, and the upper limit is proportional to the adjustment ratio.

In a further non-limiting embodiment of any of the foregoing electrified vehicles, the adjustment ratio is based on at least one of (i) a difference between a present battery state of health and an expected battery state of health, (ii) a difference between a rate of change of a present battery state of health and a rate of change of an expected battery state of health, (iii) a proximity to a predefined mileage threshold or a predefined time threshold, and (iv) a present temperature of the battery.

In a further non-limiting embodiment of any of the foregoing electrified vehicles, the predefined mileage threshold and the predefined time thresholds are based on a manufacturer warranty.

In a further non-limiting embodiment of any of the foregoing electrified vehicles, the electrified vehicle is a battery electric vehicle.

A method according to an exemplary aspect of the present disclosure includes, among other things, applying a restricted power mode in which an amount of power drawn from a battery of an electrified vehicle is limited when a state of health of the battery is below a predefined lower threshold. The method further includes deactivating the restricted power mode in response to a signal indicating a current or imminent request for acceleration of the electrified vehicle requiring power to be drawn from the battery above an upper limit of the restricted power mode.

In a further non-limiting embodiment of the foregoing method, the signal is received when the vehicle is in a driving mode permitting acceleration requiring power to be drawn from the battery above the upper limit.

In a further non-limiting embodiment of any of the foregoing methods, the signal is received when the vehicle is currently or imminently driving at a location known to correspond to a request for acceleration of the electrified vehicle requiring power to be drawn from the battery above the upper limit.

In a further non-limiting embodiment of any of the foregoing methods, the signal is received when movement of the accelerator pedal of the vehicle exceeds a pedal travel threshold.

In a further non-limiting embodiment of any of the foregoing methods, the signal is received when a rate of movement of an accelerator pedal exceeds a pedal rate threshold.

In a further non-limiting embodiment of any of the foregoing methods, the state of health of the battery is determined based on a current health of the battery at a mileage or time compared to an expected health of the battery at the mileage or the time.

DETAILED DESCRIPTION

This disclosure relates to an electrified vehicle configured to selectively deactivate a restricted power mode based on an acceleration request, such as an imminent or current acceleration request. A corresponding method is also disclosed. An example electrified vehicle includes a battery and a controller configured to apply a restricted power mode when a state of health of the battery is below a predefined lower threshold. Further, when in the restricted power mode, the controller is configured to limit an amount of power drawn from the battery. Additionally, the controller is configured to selectively deactivate the restricted power mode in response to a signal indicating a current or imminent request for acceleration of the electrified vehicle requiring power to be drawn from the battery above an upper limit of the restricted power mode. As such, the state of health of the battery is preserved without compromising vehicle performance. These and other benefits will be appreciated from the following description.

Figure 1:
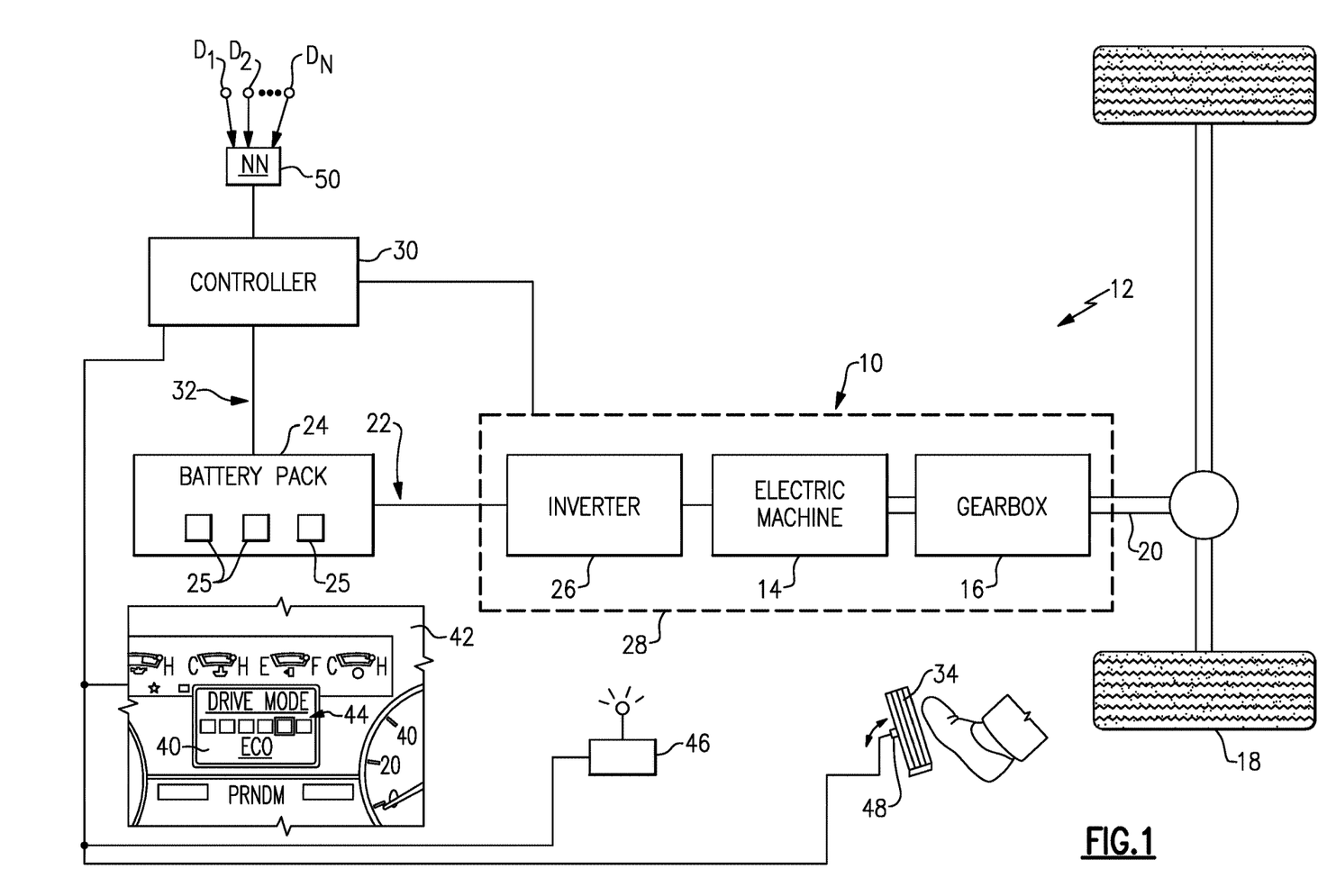
FIG. 1 schematically illustrates a powertrain of an electrified vehicle.

Referring now to the figures, FIG. 1 schematically illustrates a powertrain 10 of an electrified vehicle 12, which is shown as a battery electric vehicle (BEV). Although depicted as a BEV, it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed either alone or in combination with other energy sources to propel the electrified vehicle 12. Further, this disclosure extends to any hybrid or electric vehicle including full hybrids, parallel hybrids, series hybrids, mild hybrids, and micro hybrids, among others.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 may be provided by a permanent magnet synchronous motor, although other motors may be used. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 (i.e., a "battery") through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., groupings of battery cells commonly known as arrays) capable of outputting electrical power to operate the electric machine 14 and/or other electrical loads of the electrified vehicle 12. Other types of energy storage devices and/or output devices can also be used to electrically power the electrified vehicle 12. The electrified vehicle 12 may also include a charging system for periodically charging energy storage devices (e.g., battery cells) of the battery pack 24. The charging system may be connected to an external power source, such as a grid power source, for receiving and distributing power to the energy storage devices.

The inverter 26 may be an electronic device including IGBTs (insulated-gate bipolar transistors) or other switches adapted to convert direct current (DC) from the battery pack 24 to alternating current (AC). In response to instructions from a controller 30, the inverter 26 may activate one or more of its switches to convert direct current from the battery pack 24 to alternating current for the electric machine 14. Based on a desired torque output, the controller 30 sends one or more instructions to the inverter 26, which in turn is operable to direct an appropriate voltage and frequency of AC current from the battery pack 24 to the electric machine 14.

In addition to communicating with the inverter 26, the controller 30 is configured to monitor and/or control various aspects of the powertrain 10 associated with the electrified vehicle 12. The controller 30, for example, may communicate with the electric machine 14, the battery pack 24, and the inverter 26. The controller 30 may also communicate with various other vehicle components and monitor other vehicle conditions. The controller 30 includes electronics, software, or both, to perform the necessary control functions for operating the electrified vehicle 12.

In one non-limiting embodiment, the controller 30 is a combination vehicle system controller and powertrain control module (VSC/PCM). Although it is shown as a single device, the controller 30 may include multiple controllers in the form of multiple hardware devices, or multiple software controllers with one or more hardware devices. A controller area network 32 (CAN) allows the controller 30 to communicate with the various components of the electrified vehicle 12.

The battery pack 24 generates heat during certain conditions, including during charging and discharging operations. The controller 30 is configured, in certain conditions, some examples of which will be discussed below, to restrict the power drawn from the battery pack 24. Restricting the power drawn from the battery pack 24 is referred to herein as operating the electrified vehicle 12 in a restricted power mode or applying a restricted power mode. In the restricted power mode, the power drawn from the battery pack 24 is less in some conditions than the power that would have been drawn from the battery pack 24 if the restricted power mode was not applied. The restricted power mode may be a predefined drive mode of the electrified vehicle 12. In an example, the restricted power mode may be an economy or "eco" mode of the electrified vehicle 12 which restricts the power drawn from the battery pack 24 to prioritize range of the electrified vehicle 12 over responsiveness of the accelerator pedal 34 or performance of the electrified vehicle 12.

In the restricted power mode, such as in an eco mode, swift acceleration of the electrified vehicle 12 is restricted, thereby prolonging the range of the battery pack 24 and reducing the power drawn from the battery pack 24.

The restricted power mode is useful to assist with managing the heat generated by the battery pack 24. Restricting the power drawn from the battery pack 24 may assist with prolonging the useful life of the battery pack 24 and/or to slow a rate of aging of the battery pack 24. In a specific example, the controller 30 is configured to restrict the power drawn from the battery pack 24 by sending one or more instructions to the inverter 26.

The electrified vehicle 12 is operable in more than one drive mode, in this example. The various drive modes of the electrified vehicle 12 may be automatically applied by the controller 30 or selected by a user, such as the driver of the electrified vehicle 12, via a selector 40. An example selector 40 is illustrated in the call-out of FIG. 1. In particular, FIG. 1 illustrates a portion of a human-machine interface (HMI) 42, which in this example is a portion of a dashboard. The HMI 42 could be part of an infotainment system or other system of the electrified vehicle 12. A user can use the selector 40, which may be displayed to the user via the HMI 42, to select a drive mode. The selector 40 displays a plurality of drive modes 44 to the user. The user may use an input mechanism, such as a button on a touch screen, a button of the infotainment system, and/or a button on the steering wheel of the electrified vehicle 12, to select a particular one of the drive modes 44. Reference to the selector 40 herein includes the portion of the HMI 42 and/or the input mechanism used by the user to make the drive mode selection. In this example, there are six available drive modes 44. This disclosure extends to vehicles having one or more drive modes.

The controller 30 is responsive to the various drive modes 44 to alter the manner in which the powertrain of the electrified vehicle 12 operates. For instance, the drive modes 44 are essentially presets for different systems and components of the electrified vehicle 12, including driver assist and stability control systems, steering feel, throttle and transmission mapping, braking modes, the locking differential, etc. The drive modes 44, in particular, can alter the sensitivity of the throttle pedal, the amount of fuel supplied to the engine, the amount of computer traction available, and the suspension settings. These variations may be altered together or separately to change how the electrified vehicle 12 drives and feels. Common drive modes 44 include a sport mode, eco mode, comfort mode, snow mode, etc.

The vehicle 12 further includes a location system 46 configured to detect a location of the electrified vehicle 12. The location system 46 may be a global positioning system (GPS), a wireless communication system (such as a radio-frequency identification system), or a camera-based, shape detection system. The location system 46 may also be configured to make the electrified vehicle 12 a location-aware device, such that the location system 46 can determine whether the electrified vehicle 12 has entered or exited a geofence, which is a virtual perimeter for a real-world geographic area. The location system 46 is electrically connected to the controller 30 and is configured to relay information pertaining to the location of the electrified vehicle 12 to the controller 30. The location system 46 may also include a transceiver such that it may send and/or receive information.

The controller 30 is also coupled to a sensor 48 configured to generate a signal indicative of movement of the accelerator pedal 34. In particular, the sensor 48 may be configured to generate a signal indicative of a travel distance of the accelerator pedal 34 relative to a condition in which a user does not apply a force onto the accelerator pedal 34. Alternatively or in addition, the sensor 48 may be configured to generate a signal indicative of a rate of movement of the accelerator pedal 34. The controller 30 is able to compare the information from the sensor 48 to one or more thresholds to determine an acceleration request associated with the movement of the accelerator pedal 34.

The controller 30 may also be in communication with a neural network 50. The neural network 50 is configured to receive and process a plurality of different types of data $D_1$-$D_N$, where "N" represents any number. The neural network 50 may be a deep generative neural network, which is alternatively referred to as a flow model neural network. The neural network 50 provides a framework for machine learning. Specifically, the neural network 50 is trained to predict how various data inputs (i.e., from the data $D_1$-$D_N$) relate to locations in which the electrified vehicle 12 may imminently be accelerating at a relatively high level. In other words, the neural network is trained to identify locations corresponding to an imminent acceleration request.

The electrified vehicle 12, including the powertrain 10 and other components, shown in FIG. 1 is highly schematic and is not intended to limit this disclosure. Various additional components could alternatively or additionally be employed by the powertrain 10 and/or the electrified vehicle 12 within the scope of this disclosure.

In this disclosure, the controller 30 is configured to apply the restricted power mode when a state of health of the battery pack 24 is below a predefined lower threshold. Specifically, when the state of health of the battery pack 24 is below the predefined lower threshold, the controller 30 automatically applies the restricted power mode. The predefined lower threshold is a threshold set by a manufacturer of the electrified vehicle 12 and/or the battery pack 24. The predefined lower threshold is a lower bound of a normal operating range. The normal operating range corresponds to normal aging of the battery pack 24.

In this regard, the restricted power mode is not entered into as a result of a user selection. However, in this disclosure, the controller 30 is also configured to selectively deactivate the restricted power mode in response to a signal indicating a current or imminent user request for acceleration of the electrified vehicle 12 requiring power to be drawn from the battery pack 24 above an upper limit of the restricted power mode. In other words, despite the controller 30 applying the restricted power mode, the controller 30 will selectively deactivate the restricted power mode to prioritize acceleration in certain conditions, such as when the controller 30 identifies the presence of signals indicating a current or imminent acceleration request. For instance, if an acceleration request would normally not be applied in an "eco" mode, the controller 30 would selectively deactivate the restricted power mode to meet the requested acceleration. Such signals will be referred to as acceleration requests, below. Example acceleration requests will now be described.

In one example, the acceleration request is present, and received by the controller 30, when the electrified vehicle 12 is in a driving mode permitting acceleration requiring power to be drawn from the battery pack 24 above the upper limit. In a specific example, if a user selects a sport driving mode, the controller 30 will deactivate the restricted power mode while the sport driving mode is selected, permitting acceleration above a level that otherwise would correspond to power being drawn from the battery above the upper limit of the restricted power mode. In a sport mode, swift acceleration is prioritized above prolonging the range of the battery pack 24. In the example, once the user deactivates the sport driving mode, the controller 30 reactivates the restricted power mode.

Figure 2:
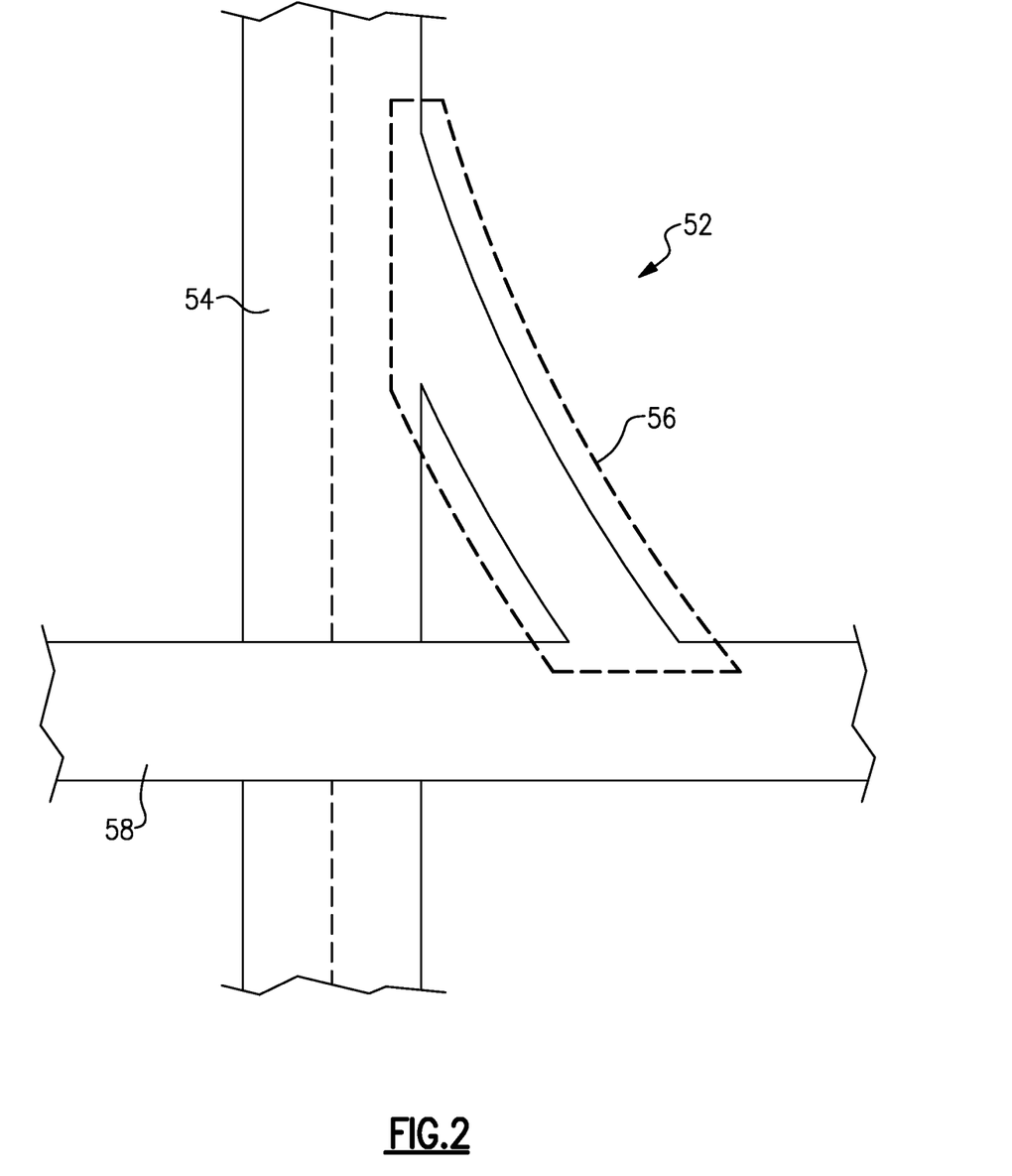
FIG. 2 is an example map illustrating a plurality of roadways and a geofenced area.

In another example, the acceleration request is present when the electrified vehicle 12 is currently or imminently driving at a location known to correspond to a request for acceleration of the electrified vehicle 12 requiring power to be drawn from the battery pack 24 above the upper limit. With reference to FIG. 2, which illustrates a map 52, the map 52 may be stored on or accessed by the location system 46 and/or the controller 30. The location system 46 is configured to determine a location of the electrified vehicle 12 relative to the map 52. The map 52 includes a plurality of roads. A first road 54 is a highway. An area 56, which may be a geofence, encompasses an on-ramp to the first road 54 from a second road 58. Using the map 52 and the location system 46, the controller 30 can identify when the electrified vehicle 12 is in the area 56. Since on-ramps are known to correspond to relatively high levels of acceleration, the controller 30 is configured to deactivate the restricted power mode when the electrified vehicle 12 is in the area 56. An on-ramp is just one example area. Other example areas include race tracks, off-road parks, etc. Further, additional areas may be learned, using the neural network 50, based on the driving patterns and behaviors of a particular electrified vehicle 12.

In another example, the controller 30 considers signals pertaining to movement of the accelerator pedal 34. In one example, the acceleration request is present when movement of the accelerator pedal 34 of the vehicle exceeds a pedal travel threshold. Alternatively or additionally, the acceleration request is present when a rate of movement of the accelerator pedal of the exceeds a pedal rate threshold.

Figure 3:
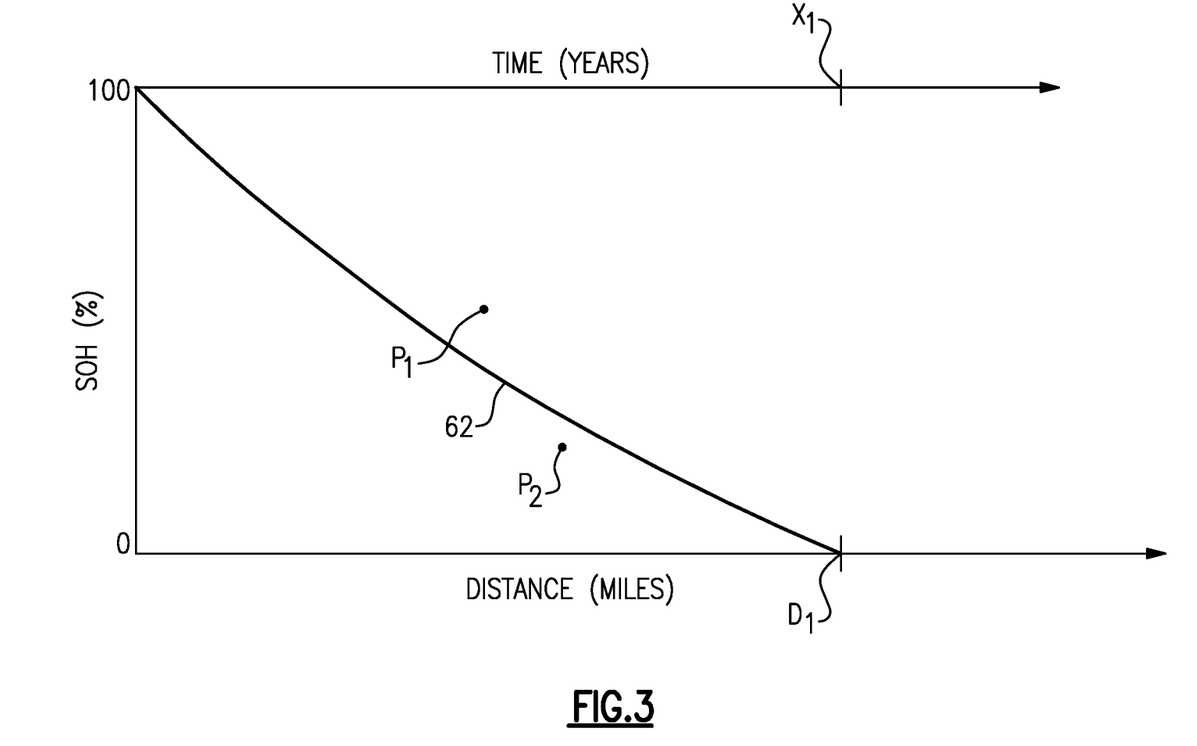
FIG. 3 is a graphical representation of the state of health of the battery relative to time and distance.

In FIG. 3, a curve is plotted with state of health of the battery pack 24 on the Y-axis relative to two values on the X-axis, which are time and distance driven. The time is in years in this example and the distance driven is in miles in this example. The value for distance driven could also be quantified by operating hours of the battery pack 24.

The curve plotted in the graph of FIG. 3 is a lower threshold curve 62 and represents the predefined lower threshold of the state of health of the battery pack 24, below which the controller 30 will apply the restricted power mode. The lower threshold curve 62 may be a warranty curve or a curve representative of another type of design target. The lower threshold curve 62 is defined by the manufacturer of the electrified vehicle 12 and/or the battery pack 24 as a low-end target for the state of health of the battery pack 24. The lower threshold curve 62 may be representative of the aging of the battery pack 24 when the electrified vehicle 12 is frequently driven in extreme environments, such as extremely hot or cold locations, or in extreme driving conditions. In this example, the lower threshold curve 62 intersects a value of 0% state of health at a time $X_1$ and a distance $D_1$. In one example, the time $X_1$ is 8 years and the distance $D_1$ is 100,000 miles. The time $X_1$ and $D_1$ are values set by a manufacturer corresponding to a manufacturer warranty of the electrified vehicle 12, in this example.

In this disclosure, the controller 30 is able to determine a present state of health of the battery pack 24 by considering information from one or more sources. One example source is a capacity of the battery pack 24 when the battery pack 24 is fully charged or has charged for a sufficient time such that the battery pack 24 should be fully charged. In general, state of health of the battery pack 24 is a figure of merit of the condition of the battery pack 24 relative to ideal conditions of the battery pack 24, such as the conditions of the battery pack 24 at the time of manufacture. The controller 30 may determine the state of health of the battery pack 24 using a battery management system. The controller 30 may consider the suitability of the battery pack 24 to perform a given application when making the state of health determination. The state of health of the battery pack 24 may be determined by evaluating or considering one or more of the following parameters: resistance, impedance, conductance, capacity, voltage, self-discharge, ability to accept a charge, number of charge—discharge cycles, age of the battery, temperature of battery during its previous uses, total energy charged and discharged, etc.

In one example, the controller 30 determines that the state of health of the battery pack 24 is at point $P_1$, which is vertically above the lower threshold curve 62. As such, the controller 30 does not apply the restricted power mode. In order to determine the state of health of the battery pack 24, such as the location of point $P_1$ on relative to the graph of FIG. 3, the controller 30 may make one or both of a time-based and a distance-based state of health determination. The point may be dictated by the lowest state of health determined using the two strategies. For instance, if a time-based state of health computation would have resulted in $P_1$ being placed above the lower threshold curve 62, and the distance-based state of health computation resulted in $P_1$ being placed below the lower threshold curve 62, then the distance-based computation is used.

In this disclosure, when the state of health of the battery pack 24 falls below the lower threshold curve 62, such as at point $P_2$ in FIG. 3, the controller 30 applies the restricted power mode. As such times, however, the controller 30 is configured to selectively deactivate the restricted power mode when an acceleration request such as those discussed above is present or imminent.

When the state of health of the battery pack 24 falls below the lower threshold curve 62, the controller 30 restricts power drawn from the battery pack 24 in proportion to the distance between the point on the graph and the lower threshold curve 62, in this example. In an example, the controller 30 is configured to determine the manner in which the power is drawn from the battery pack 24 using an adjustment ratio. In general, the adjustment ratio increases as the state of health of the battery pack 24 deviates further from the lower threshold curve 62.

In an example, the adjustment ratio is based on at least one of (i) a difference between a present battery state of health and an expected battery state of health as indicated by the lower threshold curve 62, (ii) a difference between a rate of change of a present battery state of health and a rate of change of an expected battery state of health, and (iii) a proximity to a predefined mileage or a predefined time threshold.

Relative to the difference between the present battery state of health and an expected battery state of health, the controller 30 may apply the following equation:

$$\text{Adjustment ratio} = (SOH_{exp} - SOH_{prst})/SOH_{exp} \qquad \text{(Eq. 1)}$$

Where $SOH_{exp}$ is an expected state of health of the battery pack 24 at a particular distance driven or time, and $SOH_{prst}$ is the present state of health of the battery pack 24 at that same distance driven or time as indicated by the lower threshold curve 62. Equation 1 may be performed for both distance driven and time, and the controller 30 may use the greater of those two adjustment ratios.

The controller 30 may not use Equation 1 in some examples and instead may derive an adjustment ratio according to the rate of change, or first derivative, of $SOH_{prst}$ as compared to the rate of change, or first derivative, of $SOH_{exp}$. The controller 30 may alter the adjustment ratio indicated by Equation 1 based on the comparison of the rates of change to $SOH_{prst}$ and $SOH_{exp}$. The controller 30 may also determine the adjustment ratio based on a proximity to $D_1$ and/or $X_1$. The controller 30 may also consider the present temperature of the battery pack 24 when determining the adjustment ratio. The controller 30 may use an algorithm or lookup table, combine one, two, or all of these determinations, to determine the adjustment ratio. The upper limit is proportional to the adjustment ratio, and in particular is determined using an algorithm or lookup table based on the adjustment ratio.

In an example, the upper limit is set by an "eco" mode of the vehicle. In the "eco" mode, the controller 30 does not apply acceleration requests above the upper limit. In the restricted power mode, however, the controller 30 will meet such acceleration requests. In this manner, the restricted power mode can be used long-term to preserve the state of health of the battery pack 24 without compromising the user's enjoyment of the electrified vehicle 12.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   a battery; and
   a controller configured to apply a restricted power mode when a state of health of the battery is below a predefined lower threshold, wherein, when in the restricted power mode, the controller is configured to limit an amount of power drawn from the battery, and wherein the controller is configured to selectively deactivate the restricted power mode in response to a signal indicating a current or imminent request for acceleration of the electrified vehicle requiring power to be drawn from the battery above an upper limit of the restricted power mode.

2. The electrified vehicle as recited in claim 1, wherein the controller receives the signal when the vehicle is in a driving mode permitting acceleration requiring power to be drawn from the battery above the upper limit.

3. The electrified vehicle as recited in claim 2, wherein the controller receives the signal when the vehicle is in a sport driving mode.

4. The electrified vehicle as recited in claim 1, wherein the controller receives the signal when the vehicle is currently or imminently driving at a location known to correspond to a request for acceleration of the electrified vehicle requiring power to be drawn from the battery above the upper limit.

5. The electrified vehicle as recited in claim 4, wherein the location is a highway on-ramp.

6. The electrified vehicle as recited in claim 1, wherein the controller receives the signal when movement of the accelerator pedal of the vehicle exceeds a pedal travel threshold.

7. The electrified vehicle as recited in claim 1, wherein the controller receives the signal when a rate of movement of an accelerator pedal exceeds a pedal rate threshold.

8. The electrified vehicle as recited in claim 1, wherein the controller is configured to determine that the state of health of the battery is below the predefined lower threshold based on a current health of the battery at a mileage compared to an expected health of the battery at the mileage.

9. The electrified vehicle as recited in claim 1, wherein the controller is configured to determine that the state of health of the battery is below the predefined lower threshold based on a current health of the battery at a time compared to an expected health of the battery at the time.

10. The electrified vehicle as recited in claim 1, wherein the controller is configured to determine that the state of health of the battery is below the predefined lower threshold based on a current health of the battery at a mileage and a time compared to an expected health of the battery at the mileage and the time.

11. The electrified vehicle as recited in claim 1, wherein, when in the restricted power mode, the controller is configured to determine an adjustment ratio, and the upper limit is proportional to the adjustment ratio.

12. The electrified vehicle as recited in claim 11, wherein the adjustment ratio is based on at least one of (i) a difference between a present battery state of health and an expected battery state of health, (ii) a difference between a rate of change of a present battery state of health and a rate of change of an expected battery state of health, (iii) a proximity to a predefined mileage threshold or a predefined time threshold, and (iv) a present temperature of the battery.

13. The electrified vehicle as recited in claim 12, wherein the predefined mileage threshold and the predefined time thresholds are based on a manufacturer warranty.

14. The electrified vehicle as recited in claim 1, wherein the electrified vehicle is a battery electric vehicle.

15. A method, comprising:
    applying a restricted power mode in which an amount of power drawn from a battery of an electrified vehicle is limited when a state of health of the battery is below a predefined lower threshold; and
    deactivating the restricted power mode in response to a signal indicating a current or imminent request for acceleration of the electrified vehicle requiring power to be drawn from the battery above an upper limit of the restricted power mode.

16. The method as recited in claim 15, wherein the signal is received when the vehicle is in a driving mode permitting acceleration requiring power to be drawn from the battery above the upper limit.

17. The method as recited in claim 15, wherein the signal is received when the vehicle is currently or imminently driving at a location known to correspond to a request for acceleration of the electrified vehicle requiring power to be drawn from the battery above the upper limit.

18. The method as recited in claim 15, wherein the signal is received when movement of the accelerator pedal of the vehicle exceeds a pedal travel threshold.

19. The method as recited in claim 15, wherein the signal is received when a rate of movement of an accelerator pedal exceeds a pedal rate threshold.

20. The method as recited in claim 15, wherein the state of health of the battery is determined based on a current health of the battery at a mileage or time compared to an expected health of the battery at the mileage or the time.

* * * * *